(12) United States Patent
Kot

(10) Patent No.: US 8,262,058 B2
(45) Date of Patent: Sep. 11, 2012

(54) BALANCED PILOT OPERATED CHECK VALVE

(76) Inventor: Norbert J. Kot, Brookfield, WI (US)

( * ) Notice: Subject to any disclaimer, the term of this patent is extended or adjusted under 35 U.S.C. 154(b) by 397 days.

(21) Appl. No.: 12/583,980

(22) Filed: Aug. 28, 2009

(65) Prior Publication Data
US 2010/0059125 A1 Mar. 11, 2010

Related U.S. Application Data

(60) Provisional application No. 61/190,390, filed on Aug. 28, 2008.

(51) Int. Cl.
*F16K 31/122* (2006.01)
(52) U.S. Cl. ......... 251/63.5; 251/62; 251/30.01; 91/420
(58) Field of Classification Search .................. 251/63.5, 251/62, 30.01; 91/420
See application file for complete search history.

(56) References Cited

U.S. PATENT DOCUMENTS

| | | | |
|---|---|---|---|
| 2,310,100 A * | 2/1943 | Losey et al. ...................... | 91/420 |
| 2,478,002 A | 8/1949 | Mott | |
| 2,750,743 A * | 6/1956 | Korkowski et al. ............. | 91/420 |
| 2,811,958 A * | 11/1957 | Roush, Jr. .................... | 123/46 R |
| 2,959,188 A | 11/1960 | Kepner | |
| 3,165,980 A | 1/1965 | Peras | |
| 3,229,721 A | 1/1966 | Bingel | |
| 3,335,750 A | 8/1967 | Kepner | |
| 3,404,650 A | 10/1968 | Miller et al. | |
| 3,410,304 A * | 11/1968 | Paul, Jr. ........................ | 137/494 |
| 3,527,250 A | 9/1970 | Thomas et al. | |
| 3,595,264 A * | 7/1971 | Martin ........................... | 137/453 |
| 3,641,880 A * | 2/1972 | Honeycutt ...................... | 91/420 |
| 3,792,715 A | 2/1974 | Parrett et al. | |
| 3,799,032 A * | 3/1974 | Honeycutt ...................... | 91/420 |
| 3,817,154 A | 6/1974 | Martin | |
| 3,893,471 A * | 7/1975 | Byers, Jr. ...................... | 137/106 |

(Continued)

FOREIGN PATENT DOCUMENTS

CH 334050 12/1958

(Continued)

OTHER PUBLICATIONS

NGT LLC, MAC® Balanced Poppet 3-Way and 4-Way Air Valves, Undated.

(Continued)

*Primary Examiner* — John Rivell
*Assistant Examiner* — Minh Le
(74) *Attorney, Agent, or Firm* — Ryan Kromholz & Manion, S.C.

(57) ABSTRACT

A valve assembly includes a check valve element in an output chamber. The check valve element opens to permit forward flow of fluid under pressure in the output chamber from an input port to an output port. The check valve element closes to block back flow of fluid under pressure in the output chamber from the output port toward the input port. The back flow of fluid under pressure exerts a closing force upon the check valve element from within the output chamber. A counter force generating element, or pilot element, communicates with the valve element, to selectively open the valve, even in the presence of back flow pressure. The counter force generating element may apply a counter force to the check valve element, which urges the valve element toward the opened condition. The counter force may be less than the closing force, so the check valve element remains closed.

12 Claims, 7 Drawing Sheets

U.S. PATENT DOCUMENTS

| | | | |
|---|---|---|---|
| 3,906,991 A * | 9/1975 | Haussler | 137/630.13 |
| 3,975,987 A | 8/1976 | Panis | |
| 3,980,336 A | 9/1976 | Bitonti | |
| 3,981,479 A * | 9/1976 | Foster et al. | 251/63.6 |
| 4,018,136 A | 4/1977 | Kaetterhenry | |
| 4,040,600 A * | 8/1977 | Coppola et al. | 251/63 |
| 4,172,582 A | 10/1979 | Bobnar | |
| 4,192,338 A | 3/1980 | Gerulis | |
| 4,244,275 A * | 1/1981 | Smilges | 91/420 |
| 4,287,812 A | 9/1981 | Iizumi | |
| 4,291,718 A * | 9/1981 | Sanin et al. | 137/87.06 |
| 4,397,221 A | 8/1983 | Friesen et al. | |
| 4,500,069 A | 2/1985 | Barber et al. | |
| 4,531,449 A | 7/1985 | Reith | |
| 4,694,730 A * | 9/1987 | Krieger et al. | 91/170 MP |
| 4,727,792 A | 3/1988 | Haussler | 91/420 |
| 4,793,590 A * | 12/1988 | Watson | 251/63.5 |
| 4,838,306 A | 6/1989 | Horn et al. | |
| 5,081,904 A | 1/1992 | Horn et al. | |
| 5,178,191 A * | 1/1993 | Schaefer | 137/884 |
| 5,188,015 A * | 2/1993 | Hageman | 91/321 |
| 5,400,816 A * | 3/1995 | Gerstenberger | 137/106 |
| 5,676,169 A * | 10/1997 | Landrum | 137/106 |
| 5,960,814 A | 10/1999 | Kot | |
| 2004/0112208 A1 * | 6/2004 | Kot, II | 91/420 |

FOREIGN PATENT DOCUMENTS

| | | |
|---|---|---|
| DE | 1217212 | 5/1966 |
| DE | 1943090 | 3/1971 |
| DE | 2449599 | 4/1976 |
| FR | 1071100 | 4/1954 |
| GB | 449876 | 1/1935 |
| GB | 603795 | 9/1945 |
| GB | 1379455 | 2/1972 |
| JP | 57-12170 | 1/1982 |
| RU | 379801 | 7/1973 |
| RU | 670260 | 7/1979 |
| RU | 671765 | 7/1979 |
| RU | 674706 | 7/1979 |
| WO | WO 9820260 A2 * | 5/1998 |

OTHER PUBLICATIONS

NGT, LLC Catalog, NGT Specialty Valves, Current as of Jan. 12, 2010.

USPTO Office Action dated Sep. 29, 1998 regarding U.S. Appl. No. 08/928,935, 5 pages.

* cited by examiner

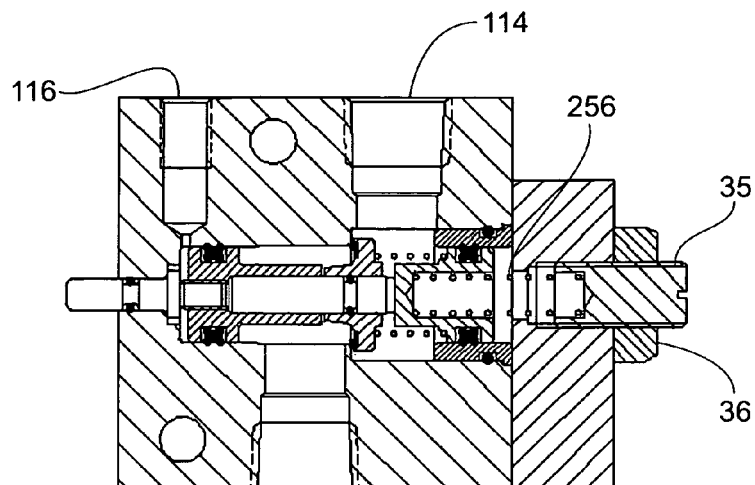 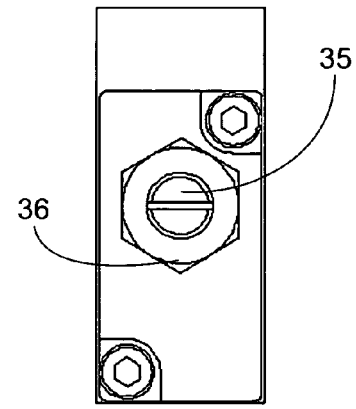
Fig. 5A　　　　　　　　Fig. 5B
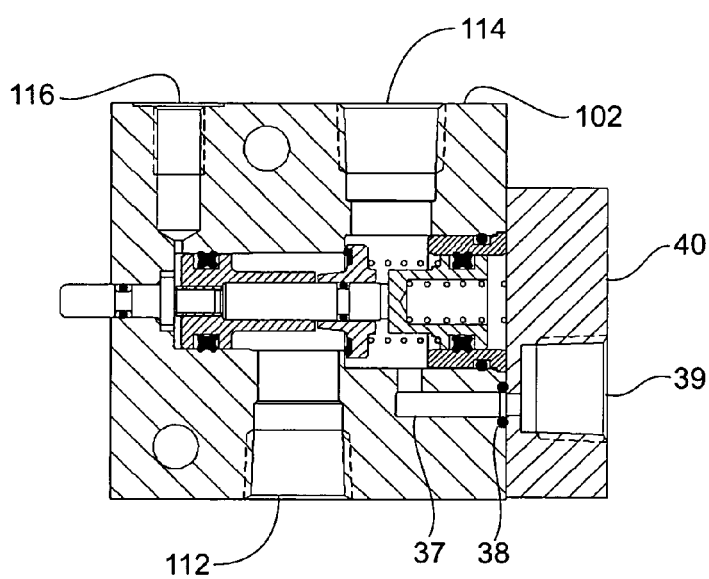 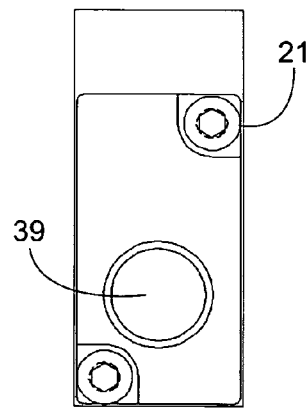
Fig. 6A　　　　　　　　Fig. 6B

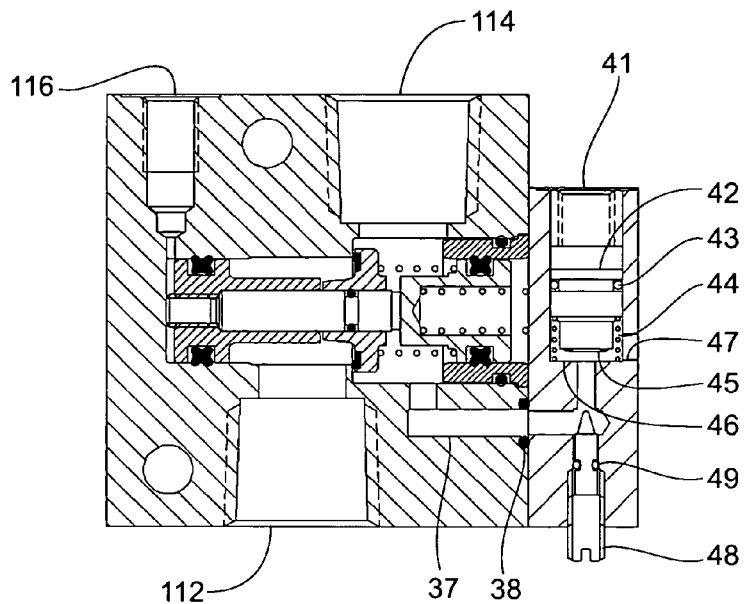
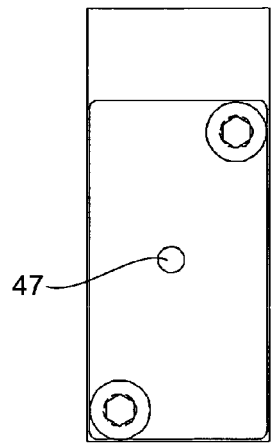
Fig. 7A
Fig. 7B
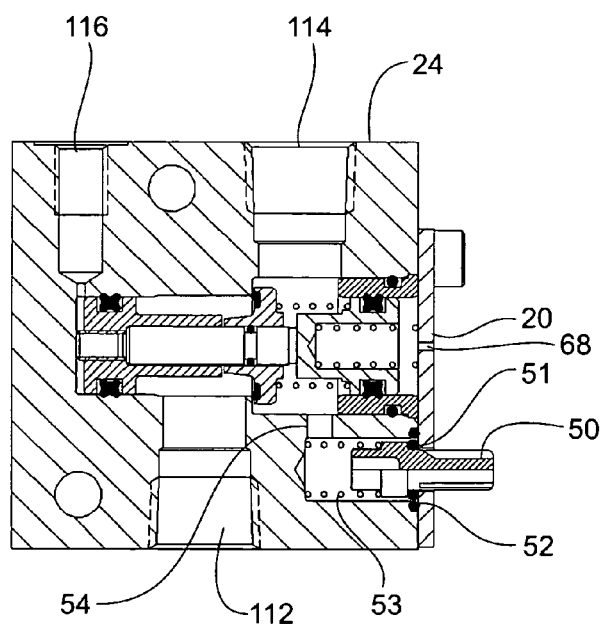
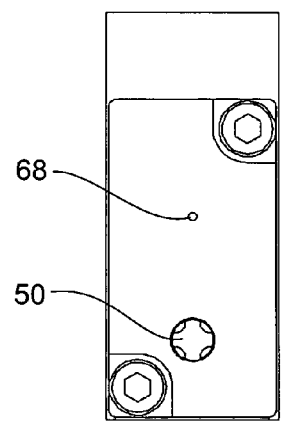
Fig. 8A
Fig. 8B

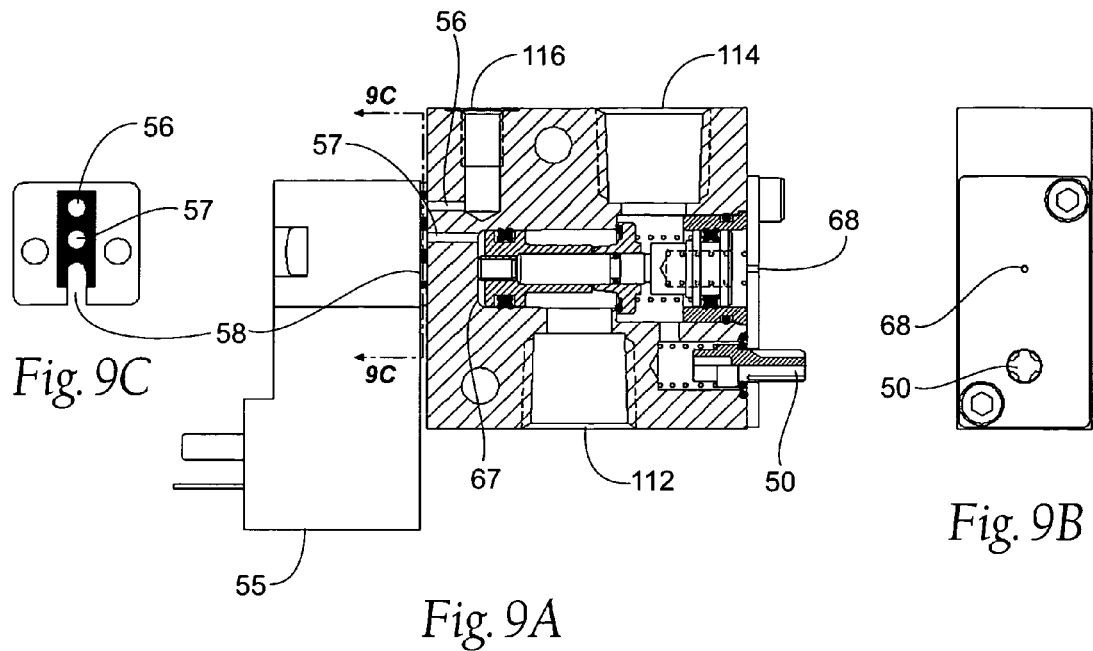
Fig. 9C
Fig. 9A
Fig. 9B
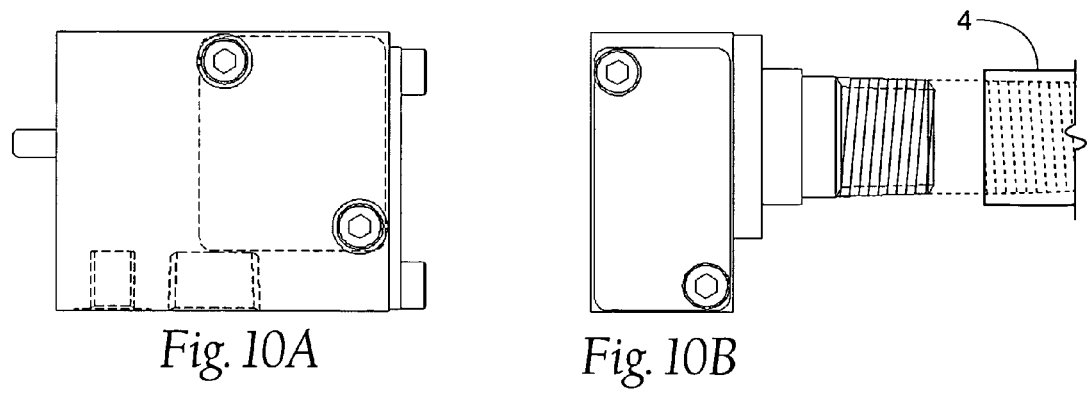
Fig. 10A
Fig. 10B
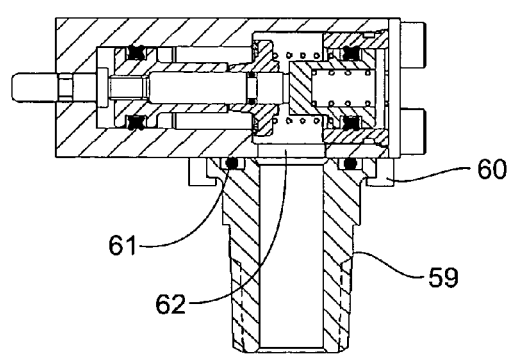
Fig. 10C

BALANCED PILOT OPERATED CHECK VALVE

RELATED APPLICATION

This application claims the benefit of U.S. Provisional Patent Application Ser. No. 61/190,390, filed 28 Aug. 2008, and entitled "Flow Control Valve," which is incorporated herein by reference in its entirety.

FIELD OF THE INVENTION

The invention relates to fluid pressure operated systems and devices, particularly those required to maintain position while maintaining a fluid tight seal.

BACKGROUND OF THE INVENTION

Systems and devices using fluid pressure for lifting and holding position are known. These systems and devices typically include check valves, which prevent sudden and potentially damaging loss of pressure when the supply of pressurized fluid unexpectedly decreases or fails. Typically, the check valves are opened either by applying a lower pressure pilot fluid, or by applying manual pressure, sufficient to overcome the locking forces.

The amount of force required to open a check valve depends upon the area of the main check valve that is locked, and the magnitude of the pressure. For example, to unseat a main check valve having a 0.75 inch diameter, which is seated at a pressure of 100 psi, about 44 pounds of opening force must be applied. This opening force is more than a typical operator can apply, either manually or using a solenoid. Furthermore, the higher force on the main check seat imposes added wear and tear, which leads to reduced operating life. The requirement of large pilot pistons also increases the overall dimensions of the valve itself.

There remains a need for pilot operated check valves requiring reduced operating forces, which, in turn, will lead to increased operating life at higher pressures. There is also a need for pilot check valves having a more compact size.

SUMMARY OF THE INVENTION

The invention provides a valve assembly comprising an output chamber, or cartridge bore, for receiving a fluid under pressure. The output chamber has an inlet passage, or input reentrant bore, attachable to a source of fluid under pressure and an outlet passage, or output reentrant bore, attachable to a load.

The valve assembly includes a check valve element in the output chamber. The check valve element is operable in an opened condition, which permits forward flow of fluid under pressure in the output chamber from the source toward the load. The check valve element is also operable in a closed condition, which blocks back flow of fluid under pressure in the output chamber from the load toward the source. The back flow of fluid under pressure exerts a closing force upon the check valve element from within the output chamber. A back flow situation may arise, for example, because of a sudden, unanticipated loss of pressure in the inlet passage. The check valve element holds the load in this pressure change event.

According to the invention, the valve assembly further includes a counter force generating element, which is located within the output chamber and coupled to the valve element. The counter force generating element operates in response to pressure caused by the back flow of fluid in the output chamber. The element applies a counter force to the check valve element, which urges the valve element toward the opened condition. The counter force is, by purpose, less than the closing force, so the check valve element remains in the closed, load holding condition. Nevertheless, the presence of the counter force reduces the overall sealing forces applied by the check valve element, thereby reducing the magnitude of force which is ultimately required to unseat the check valve element when it is required to relieve the load pressure. Wear and tear on the check valve element is reduced.

In one embodiment, the counter force generating element applies the counter force from outside the output chamber.

In one embodiment, the valve assembly further includes a relief element located outside the output chamber and coupled to the check valve element. The relief element applies an external opening force, which, in combination with the counter force, moves the check valve element to the opened condition against the closing force in the output chamber. The opening force allows reverse flow from the output to input so that the load pressure can be relieved under controlled circumstances.

Since the counter force is present to reduce the overall magnitude of force required to unseat the check valve element, wear and tear on both the relief element and check valve element are reduced. Furthermore, due to the presence of the counter force, the relief element can be operated by typical manual force, or by force typically applied by an external mechanical actuator, like a solenoid. The presence of the counter force also makes possible the design of smaller valve assemblies.

Additional advantages of the invention include:

1. A seal on the piston rod to allow for a smaller design and ease of manufacture.
2. Coned shaped poppet for increased flow from input to output.
3. End cap spring inside of the rod for a more compact package and less impact due to a decrease in piston rod weight.
4. The bearing sleeve design allows for a more compact design and greater concentricity between the piston and the bore.
5. The sleeve may now be an integral part of the piston, eliminating an extra part.
6. Changed shape of poppet shortens the valve length.
7. The valve assembly provides a fluid tight design, which eliminates drift due to leaky or worn spools.

Generally, a valve according to the present invention has a valve body that includes a cartridge bore that has a piston bore, an input counterbore, an output counterbore, and a bearing counterbore. The input counterbore and the output counterbore meet at a sealing ledge, or poppet seat. An input reentrant bore, which intersects the input counterbore, is formed into the valve body. An output reentrant bore, which intersects the output counterbore, is formed into the valve body. Also, a pilot reentrant bore, which intersects the piston bore, is formed into the valve body.

A piston cartridge disposed at least partially within the cartridge bore. The piston cartridge includes a longitudinal piston rod, a first piston head secured to one end of the piston rod, and a second piston head secured to a second end of the piston rod. The second piston head is disposed in the piston bore of the cartridge bore. The piston cartridge also includes a poppet member slidably disposed on the piston rod within the output counterbore and a poppet bias spring located between the poppet member and the first piston head. The poppet bias spring biases the poppet member in a poppet bias direction against the sealing ledge or poppet seat.

An embodiment of a valve according to the present invention has an end cap spring acting against the first piston head, biasing the piston rod in the poppet bias direction.

An embodiment of a valve according to the present invention may have a bearing sleeve inserted into the bearing counterbore, extending into the output counterbore, wherein the first piston head is disposed in the bearing sleeve.

According to an embodiment of a valve according to the present invention, the valve body may be formed as a unitary member.

According to an embodiment of a valve according to the present invention, the valve may also include a flow control mechanism. The flow control mechanism includes a mounting plate including a threaded adjusting aperture formed therethrough and a threaded adjusting screw extending through said adjusting aperture. A lock nut may be threaded onto the adjusting screw and be adapted to selectively prevent rotation of the adjusting screw with respect to the mounting plate. The mounting plate is preferably coupled to the valve body to cover said bearing sleeve counterbore and the adjusting screw extends into the output counterbore.

An embodiment of a valve according to the present invention may include an adjustable pilot mechanism. The adjustable pilot mechanism preferably includes a mounting plate including a threaded adjusting aperture formed therethrough, a threaded adjusting screw extending through the adjusting aperture and a lock nut threaded onto the adjusting screw and adapted to selectively prevent rotation of the adjusting screw with respect to the mounting plate. The mounting plate is preferably coupled to said valve body to cover said bearing sleeve counterbore and the adjusting screw preferably abuts the end cap spring. A counterbalance mechanism may also or alternatively be provided. The counterbalance mechanism may include a counterbalance reentrant bore formed into the valve body and intersecting the pilot reentrant bore and the output reentrant bore.

An embodiment of a valve according to the present invention may include a sensor reentrant bore formed into the valve body where the sensor reentrant bore is in fluid communication with the output counterbore and spaced from the output reentrant bore.

An embodiment of a valve according to the present invention may further or alternatively include an auto release mechanism. The auto release mechanism may include a release housing having a sensor input port, a control input port and a release output port. The auto release mechanism may also include a release piston adapted to selectively allow flow from the sensor input port to the release output port, wherein the release piston is biased open by a release piston bias spring and may be closed by applying a fluid pressure to the piston through the control input port. The auto release mechanism may further include a needle valve to adjust a flow of fluid through the sensor input port.

An embodiment of a valve according to the present invention may further or alternatively include a manual release mechanism accessible from without the valve body, adapted to selectively release fluid from the output counterbore. The manual release mechanism may be a plunger extending through the valve body and abutting the piston cartridge within the piston bore.

Alternatively, the manual release mechanism may include a manual release reentrant bore in fluid communication with the output counterbore, and a fluted plunger disposed at least partially in the manual release reentrant bore.

An embodiment of a valve according to the present invention may further or alternatively include an output swivel including a throughbore in fluid communication with the output reentrant bore, and a swivel mounting plate stationarily coupled to the valve body, where the swivel mounting plate supports the output swivel in a rotatable relationship with the valve body.

An embodiment of a valve manifold according to the present invention includes a plurality of cascaded valves, where each valve includes a cartridge bore comprising a piston bore, an input counterbore, an output counterbore, and a bearing counterbore, where the input counterbore and the output counterbore meet at a sealing ledge. Each valve also includes an input bore which intersects the input counterbore, an output bore which intersects the output counterbore and a pilot bore which intersects the piston bore. Each valve in the manifold also includes a piston cartridge disposed at least partially within the cartridge bore. The piston cartridge includes a longitudinal piston rod, a first piston head secured to one end of the piston rod and a second piston head secured to a second end of the piston rod, where the second piston head is disposed in the piston bore. Each valve further includes a poppet member slidably disposed on the piston rod within the output counterbore, and a poppet bias spring located between the poppet member and the first piston head biasing the poppet member in a poppet bias direction against the sealing ledge.

Each valve may further include an end cap spring acting against the first piston head, biasing the piston rod in the poppet bias direction, and a bearing sleeve inserted into the bearing counterbore, extending into the output counterbore. The first piston head may be disposed in the bearing sleeve.

An embodiment of a valve manifold according to the present invention may include a first valve of the plurality of valves that has a pressure source bore in fluid communication with the input counterbore of the first valve, wherein the pressure source bore is in fluid communication with the input bore of a second valve of the plurality of valves. The pressure source bore of the first valve may be at least substantially diametrically opposed from the input bore of the first valve, across the input counterbore of the first valve.

An embodiment of a valve according to the present invention may include a valve body comprising a cartridge bore including a piston bore, an input counterbore, an output counterbore, and a bearing counterbore, said input counterbore and said output counterbore meeting at a sealing ledge. An input reentrant bore, which intersects the input counterbore may be formed in the valve body, and an output reentrant bore, which intersects the output counterbore, may also be formed in the valve body. The valve body may also include a pilot reentrant bore that does not intersect the cartridge bore, but rather intersects a pilot control reentrant bore formed in the valve body. A solenoid control reentrant bore, which intersects said piston bore is formed in the valve body.

A piston cartridge is disposed at least partially within the cartridge bore. The piston cartridge comprises a longitudinal piston rod a first piston head secured to one end of the piston rod, and a second piston head secured to a second end of the piston rod, where the second piston head is disposed in the piston bore. The piston cartridge also includes a poppet member slidably disposed on the piston rod within the output counterbore, and a poppet bias spring located between the poppet member and the first piston head biasing the poppet member in a poppet bias direction against the sealing ledge. The valve may further include an end cap spring acting against the first piston head, biasing the piston rod in the poppet bias direction, and a bearing sleeve inserted into the bearing counterbore, extending into the output counterbore. This embodiment may include a pilot control solenoid including a pilot fluid input port, a pilot fluid output port and an exhaust fluid port. The pilot fluid input port is in fluid communication with the pilot control reentrant bore and the pilot fluid output port is in fluid communication with the solenoid control reentrant bore, wherein the pilot fluid input port may be selectively placed in fluid communication with the pilot fluid output port and may be selectively placed in fluid communication with the exhaust fluid port. The first piston head is disposed in the bearing sleeve.

These and other features and advantages of the invention will become apparent from the following description and drawings.

BRIEF DESCRIPTION OF THE DRAWINGS

FIG. 5A is a cross-section view of an embodiment of a check valve according to the present invention including an adjustable pilot mechanism.

FIG. 5B is an elevation view of the embodiment of FIG. 5A.

FIG. 6A is a cross-section view of an embodiment of a check valve according to the present invention including a sensor port.

FIG. 6B is an elevation view of the embodiment of FIG. 6A.

FIG. 7A is a cross-section view of an embodiment of a check valve according to the present invention including a remote controlled exhaust mechanism.

FIG. 7B is an elevation view of the embodiment of FIG. 7A.

FIG. 8A is a cross-section view of an embodiment of a check valve according to the present invention including an alternate manual exhaust.

FIG. 8B is an elevation view of the embodiment of FIG. 8A.

FIG. 9A is a cross-section view of an embodiment of a check valve according to the present invention including a solenoid controlled pilot.

FIG. 9B is an elevation view of the embodiment of FIG. 9A.

FIG. 9C is a view taken along line 9C-9C of FIG. 9A.

FIG. 10A is an elevation view of an embodiment of a check valve according to the present invention including an output swivel mount.

FIG. 10B is an elevation view of the embodiment of FIG. 10A.

FIG. 10C is a cross-section view of the embodiment of FIG. 10A.

DESCRIPTION OF THE PREFERRED EMBODIMENT

Figure 1:
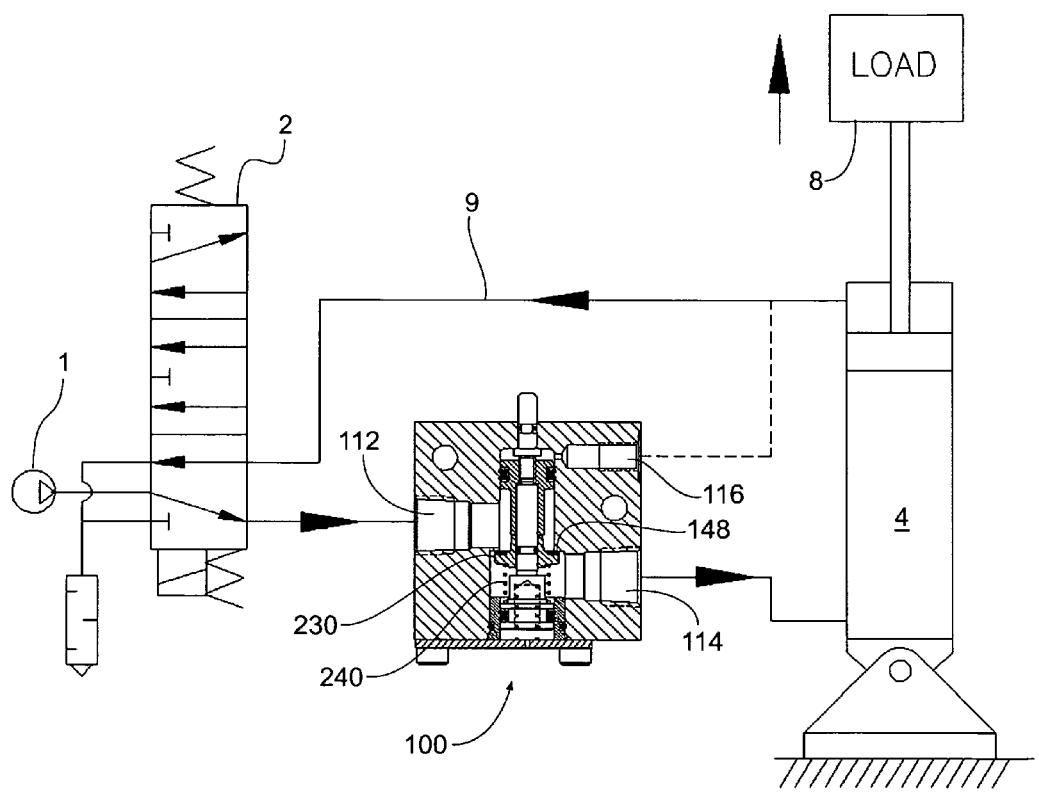
FIG. 1 is a schematic representation of a fluid flow system according to the present invention.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

I. The System

Air pressure from the supply source 1 is connected to a control valve 2. When the control valve 2 is energized to advance the air cylinder 4, the air pressure goes into the check valve 100 and applies force to the poppet 230. The poppet 230 is biased toward the seat 148 with a low force poppet spring 240 that opens when there is about a 1-2 psi pressure difference across the poppet 230. With the poppet 230 open, the air moves into the air cylinder 4 raising the load 8.

The air on the rod side of the cylinder 4 needs a passage to exhaust to atmosphere. The path is provided by a straight passage through the control valve 2 to atmosphere.

To lower the load, air pressure is applied to the rod side of the cylinder 4, which is opposite the direction shown in FIG. 1. At the same time air is applied to the rod side, the opposite side needs a path to exhaust to atmosphere. In order for this to happen, the check valve 100 must be opened. This is accomplished by tapping air pressure off the retract line 9 or from an outside source and applying it to the pilot port 116. The air pressure from the pilot port 116 opens the poppet 230 allowing air to flow from the output port 114 to the input port 112, back through the control valve 2 and exhaust to atmosphere.

II. Valve

Figures 2A, 2B:
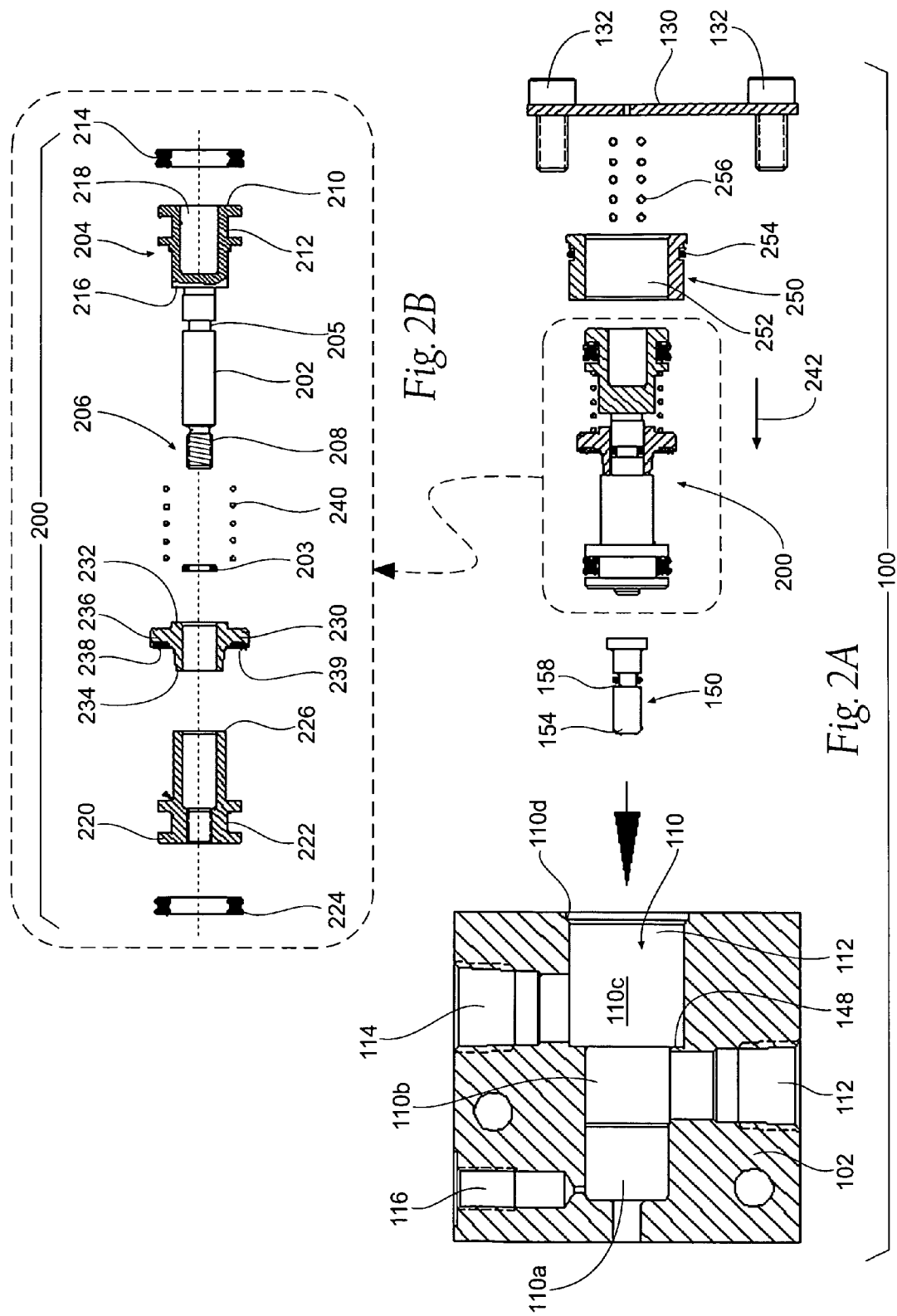
FIGS. 2A and 2B are exploded cross-section views of an embodiment of a check valve according to the present invention.

Turning now to FIG. 2A and FIG. 2B, an embodiment 100 of a valve according to the present invention is shown. Generally, the valve 100 includes a valve body 102, into which a plurality of bores are formed. A first bore 110 is a cartridge bore, which includes a piston bore 110a, an input counterbore 110b, an output counterbore 110c, and a bearing sleeve counterbore 110d. An input reentrant bore 112 and an output reentrant bore 114 may be formed in a spaced relationship into the valve body 102. The input reentrant bore 112 intersects the cartridge bore 110 at the input counterbore 110b and the output reentrant bore 114 intersects the cartridge bore 110 at the output counterbore 110c. A pilot reentrant bore 116 is formed into the valve body 102 and intersects the cartridge bore 110 at the piston bore 110a.

Inserted into the cartridge bore 110 is a piston cartridge 200. In a first embodiment, the piston cartridge 200 generally includes a longitudinal piston rod 202, a first piston head 210, a second piston head 220, and a poppet member 230 slidably disposed on the piston rod 202 and located generally between the first and second piston heads 210, 220. The substantially free sliding movement of the poppet member 230 generally, without pilot pressure, checks air in one direction and allows free flow in the opposite direction. The first piston head 210 is connected to a first end 204 of the piston rod 202, and the second piston head 220 is connected to a second end 206 of the piston rod 202, which may include a threaded engagement means 208 to cooperate with the second piston head 220. The first piston head 210 is preferably formed with an annular piston seal groove 212 about its circumference, which accommodates placement of a first piston seal 214, such as a grooved elastomeric O-ring. The first piston head 210 also preferably provides a first poppet stop surface 216 and a piston bias bore 218 adapted to accept a piston bias spring, such as an end cap spring 256. The second piston head 220 is preferably formed with an annular piston seal groove 222 about its circumference, which accommodates placement of a second piston seal 224, such as a grooved elastomeric O-ring. The second piston head 220 also preferably provides a second poppet stop surface 226.

The poppet member 230 is slidably disposed on the piston rod 202, the piston rod 202 preferably extending through the poppet member 230. Situated between the poppet member 230 and the piston rod 202, there may be a rod gasket or seal 203 such as an elastomeric O-ring that is disposed in an annular groove 205 formed about the piston rod 202. Situated between the poppet member 230 and the first piston head 210 is a poppet bias spring 240, which biases the poppet member 230 in a bias direction 242, which is generally towards the second piston head 220. The poppet member 230 itself may generally be formed as a frustoconical member extending between a first end 232 and a second end 234, and further including an annular sealing flange 236 disposed thereabout. The annular sealing flange 236 includes a sealing surface 238, which, when the piston cartridge 200 is assembled, generally faces towards the second piston head 220. Disposed on and/or recessed into the sealing surface 238 is a poppet gasket 239, which may be formed of an elastomeric material.

The piston cartridge 200 may generally be assembled by situating the rod gasket 203 in the annular groove 205 provided on the piston rod 202. The poppet bias spring 240 may be placed on the rod 202, resting against the first piston head 210. The poppet member 230 may be slid onto the piston rod 202 and the second piston head 220 may be secured to the piston rod 202. The piston seals 214,224 are placed around their respective piston heads 210,220.

As indicated above, the cartridge bore 110 is provided with a plurality of counterbores. The output counterbore 110c, formed larger than the input counterbore 110b, provides a poppet seat, or sealing ledge 148 and further provides sufficient clearance for sliding movement of the poppet member 230 and desired fluid flow. To maintain the piston cartridge 200 in a preferred orientation, a bearing sleeve 250 may be used. The bearing sleeve 250 includes a piston aperture 252, into which the first piston head 210 may be situated, the bearing sleeve 250 circumferentially contacting the first piston seal 214. Disposed around the bearing sleeve 250 is preferably a bearing sleeve seal 254, such as an elastomeric O-ring, which is adapted to sealingly engage the output counterbore 110c provided in the cartridge bore 110.

In the first embodiment 100, the piston cartridge 200 and bearing sleeve 250 is maintained in the valve body 102 by a piston cover 130, which generally extends to cover one side of the cartridge bore 110 and is secured to the valve body 102, such as by using a plurality of threaded fasteners 132. On the opposite end of the cartridge bore 110 from the piston cover 130, a manual release mechanism 150 may be provided. The manual release mechanism 150 may include a manual release plunger 154, and a plunger gasket 158. The manual release plunger 154 is a flanged post that extends through the valve body 102 and into the piston bore 110a.

This allows the release of air that may be trapped on either side of the air cylinder 4.

III. General Valve Operation

Turning back to FIG. 1, an embodiment of a system according to the present invention is shown incorporating an embodiment of a check valve according to the present invention. A fluid source 1 is coupled through a valve 2 to the check valve 100 input bore 112.

The output bore 114 is connected to the plunger side of an air cylinder 4. The rod side of the air cylinder 4 exhausts out through the control valve 2 to the atmosphere. When fluid is pumped from the supply source 1, it forces the plunger in the air cylinder 4 towards the rod side, thus extending the rod to lift a load 8. To lower the load 8, the flow control valve 2 is manipulated to connect the supply source 1 to the rod side of the cylinder 4 through the retract line 9. However, the fluid on the plunger side of the cylinder 4 needs to be able to exhaust if the plunger is to move. Thus, a tap line may place the retract line 9 in fluid communication with the pilot port 116 on the valve 100. In this way, the fluid pressure in the piston bore 110a forces the cartridge 200 against the bias of the end cap spring 156, thereby unseating the poppet member 230, thus opening the valve 100 and allowing the exhaust fluid from the plunger side of the cylinder 4 to enter the output bore 114, past the poppet member 230, out of the input bore 112, and to exhaust out through the control valve 2 to the atmosphere. In the event of any loss of fluid pressure from the supply source 1, however, the check valve 100 will close, thereby maintaining the cylinder 4 and load 8 in a substantially safe and static condition.

Advantages of the invention include smaller valves allowing for a more compact design and higher pressure capacity.

III. Control Valve Options

A. Flow Controls

Figure 3A:
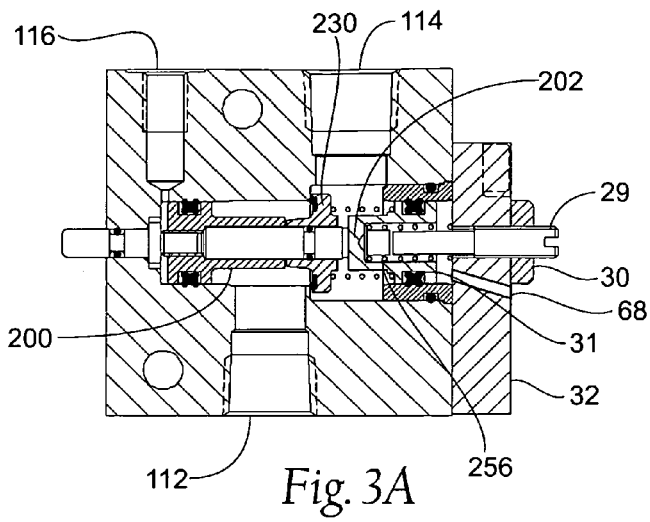
FIG. 3A is a cross-section view of an embodiment of a check valve according to the present invention including a flow control option.
Figure 3B:
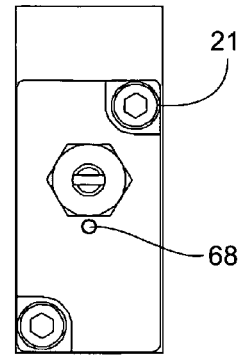
FIG. 3B is an elevation view of the embodiment of FIG. 3A.

A first option is a flow control option as shown in FIGS. 3A and 3B. The flow control allows the operator to adjust the speed of flow without having to add an external flow control. This eliminates cost and makes for a more compact design. Metering out is the preferred method of controlling air cylinder speed.

The flow control meters airflow from the output port 114 to the input port 112. This is accomplished by limiting the movement of the cartridge 200 when air is applied to the pilot port 116. Air pressure applied to the pilot port 116 moves the entire cartridge assembly 200 away from the poppet seat 148, causing the passage to open between the output port 114 and the input port 112. An adjusting screw 29 extending through the housing 102 and into the output counterbore 110c limits cartridge 200 travel and therefore, limits the travel of the poppet 230. A lock nut 30 is used to lock the adjusting screw 29 in position. A shock absorbing impact pad (not shown) may be installed in or on the piston rod 202 to limit the impact force between the piston rod 202 and the adjusting screw 29. The end cap spring 256 keeps the poppet 230 in contact with the poppet seat 148 when the valve 100 is in the static, or non-piloted condition. A flow control cover plate 32 is used to close the end of the valve 100. The cover 32 is threaded with fine threads in order to engage the adjusting screw 29 and allow for flow adjustment. The cover is secured with screws 21. A small air passage 68 is machined into the flow control cover plate 32 to prevent back pressure.

B. Counterbalance

Figure 4A:
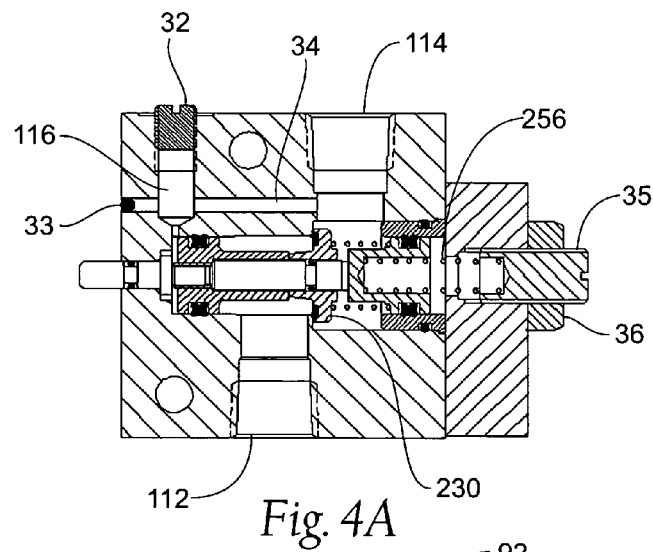
FIG. 4A is a cross-section view of an embodiment of a check valve according to the present invention including a counterbalance mechanism.
Figure 4B:
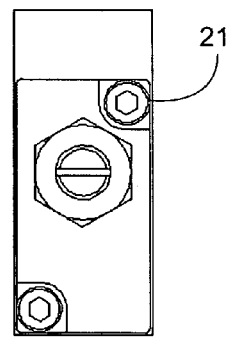
FIG. 4B is an elevation view of the embodiment of FIG. 4A.

Another option is a counterbalance mechanism, as seen in FIGS. 4A and 4B. The counterbalance valve can be adjusted to hold a load in position and maintain air pressure to hold that position. Because the counterbalance maintains a constant resistance pressure in the air cylinder, the load will not take off in a run-away condition when the load is lowered.

The counterbalance uses an air passage 34 that is drilled in the valve body 102 that intersects the output port 114 and the pilot port 116. The pilot port 116 is sealed air-tight with a threaded plug 32 and sealant. The drilled hole is sealed with a stainless steel ball 33. When air pressure increases on the output side 114, the same pressure is now applied to the piston bore 110a. If the air pressure increases enough to overcome the end cap spring 256, the cartridge 200 will begin to open, allowing air to flow from the output port 114 to the input port 112. The air pressure required to open the valve can be adjusted by turning the adjusting screw 35. Turning the screw 35 clockwise will increase the pressure required to open the valve 100, due to compression of the end cap spring 256. Counterclockwise adjustment will reduce the pressure required to open the valve 100. A locknut 36 will lock the adjusting screw 35 in place.

Figure 4C:
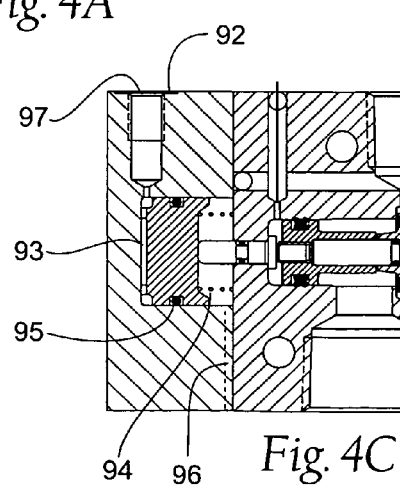
FIG. 4C is an elevation view of an embodiment of a check valve according to the present invention including a counterbalance pilot.

As seen in FIG. 4C, a pilot can be added to the counterbalance by mounting a cover plate 92 to the pilot end of the valve so that the counterbalance can be opened with a pilot signal if desired. The cover plate 92 houses a piston 93 that is biased with a spring 94, and is sealed with a seal 95. An air passage 96 is machined into the cover plate 92 to prevent pressure buildup. When pressure is applied to the pilot port 97, the piston 93 moves and applies a force to the manual release 154 and moves the cartridge 200 to the open position.

C. Adjustable Pilot

Another option is an adjustable pilot mechanism as shown in FIGS. 5A and 5B. The adjustable pilot valve is designed for faster and quicker stopping. In some machines where long plumbing lines store large amounts of air, it may take a couple of seconds to empty those air lines. If the pilot port 116 is connected to these long lines, the stored pressure in the exhaust lines will hold the valve open until the pressure drops low enough to close the valve. The adjustable pilot design solves this problem by setting the valve to close at a desired pilot pressure.

The air pressure required to open the valve can be adjusted by turning an adjusting screw 35. Turning the screw clockwise will increase the pressure required to open the valve, due to compression of the end cap spring 256. Counterclockwise adjustment will reduce the pressure required to open the valve. A locknut 36 will lock the adjusting screw 35 in position so that the pressure setting doesn't change during operation.

D. Sensor Port

Another option is a sensor port as shown in FIGS. 6A and 6B. A sensor port added to a standard valve allows the operator to monitor whether a device is pressurized.

A sensor port 39 can be added to allow for the insertion of a pressure sensor that will signal when pressure is trapped or exhausted in the output counterbore 114 of the valve. An air passage 37 in fluid communication with the output counterbore 114 is added to the valve body 102 and sealed with an O-ring 38. A cover plate 40 can have a number of different port configurations. The cover plate 40 is secured with screws 21.

E. Auto Release with Metered Exhaust

A pneumatically operated release mechanism, or auto release, may be used as shown in FIGS. 7A and 7B.

Auto release is advantageous when the valve is buried in a system and/or not readily accessible for service. A pilot signal can be removed from the valve to release the trapped air to allow for safe servicing of the equipment. A needle valve 48 makes sure that the air pressure is release slowly, so that loads are gently lowered to the ground.

The auto release consists of an air passage 37 and O-ring seal 38. An air signal is applied to a second pilot port 41 that can come from any air source. Air pressure is applied to the second pilot port 41, which moves a piston 42 to seal on a piston seat 46. The resulting seal is air-tight because of the O-ring 45 attached to the face of the piston 42. When the air pilot signal is removed, the piston 42 moves away from the seat 46 causing an air passage to open to atmosphere through an exhaust hole 47. The needle valve 48 allows for a controlled release of the exhaust air. An O-ring 49 on the needle valve 48 keeps the air from leaking past the needle.

F. Manual Exhaust to Atmosphere

A manual exhaust may be provided on a side of the valve opposite the piston bore 110a, as shown in FIGS. 8A and 8B. The advantage of this design is that it allows for a manual release when a solenoid is attached to the valve. It also allows the trapped air to be directly released to atmosphere without first going through a control valve.

A rear manual release button 50 can be added when a solenoid is attached to the location of the standard manual release 22, or if otherwise desired. The button 50 is sealed with an O-ring 51 seated around a portion of the button 50 as shown. The button 50 is preferably fluted, or has grooves cut down a majority of its length that stop right above the O-ring 51, to allow the O-ring 51 to seal between the manual release button 50 and the cover 20. An outer O-ring 52 seals between the cover plate 20 and the valve body 102. A manual release spring 53 keeps the manual release button 50 biased against the cover plate 20. An air passage 54 in fluid communication with the output counterbore 114 completes the path that will allow air to exhaust to atmosphere when the rear manual release button 50 is depressed.

G. Solenoid Controlled Pilot with Manual Release

It is sometimes easier to control the pilot signal with a solenoid valve that is piped to a constant pressure source, as shown in FIGS. 9A and 9B. The check valve can be opened and closed by sending an electronic signal to the solenoid.

The solenoid valve 55 may be a normally closed 3-way, two-position, air valve that is shifted with AC or DC voltage. There are 3 ports on the valve, and 2 are directly connected to the valve body 102 through a sealed air passage. A pilot passage, or pilot control reentrant bore, 56 is in fluid communication with the pilot port 116 and a piston passage, or solenoid control reentrant bore, 57 is in fluid communication with the piston bore 110a in contact with the cartridge 200. An exhaust port 58 on the solenoid 55 is open to the atmosphere. Air pressure is continuously supplied to the pilot port 116. When the solenoid 55 is energized, it opens and allows air to flow from the pilot port 116, through the pilot passage 56, through the solenoid valve 55 and back into the valve body 102, via the piston passage 57. This causes the cartridge 200 to shift and open the valve. When the electronic signal is removed, the air passage through the solenoid valve 55 is closed and the air inside the piston bore 110a is released back through the piston passage 57 and out the exhaust port 58. The manual release button 50, if desired, may be moved to the back of the valve because the solenoid 55 is mounted in the original location of the manual release (see the previous section).

H. Swivel Design

Yet another option is a swiveling valve, as shown in FIGS. 10A, 10B and 10C. The swivel design allows for direct attachment to a pneumatic device, such as an air cylinder 4, and the ability to rotate the valve to any rotational position when attached to an air cylinder 4. This eliminates extra plumbing and makes for a compact design. Attaching the valve directly to the air cylinder 4 also helps to eliminate cylinder bounce.

The swivel design consists of a standard valve with a swivel 59 attached to allow the valve to be directly attached to the air cylinder 4 or other pneumatic devices. The swivel 59 is held in place with a swivel plate 60 and is sealed air-tight with an O-ring 61. The air passage 62 through the valve body 102 provides a path from the output counterbore 110c to the swivel 59. The swivel plate 60 is held in place with screws (not shown).

I. Manifold Mounted Cartridge

Figure 11C:
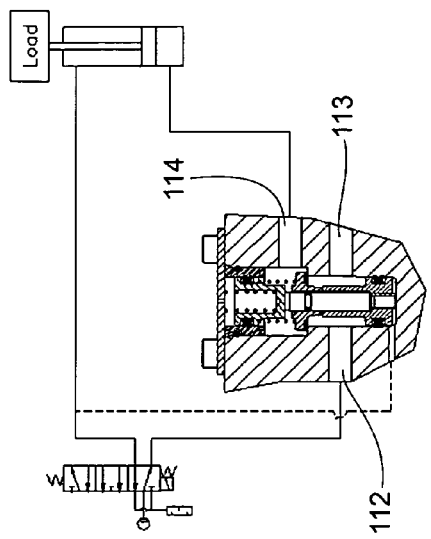
FIG. 11C is a cross-section view of one of the plurality of valves of the embodiment of FIG. 11A schematically connected in a fluid system.
Figure 11A:
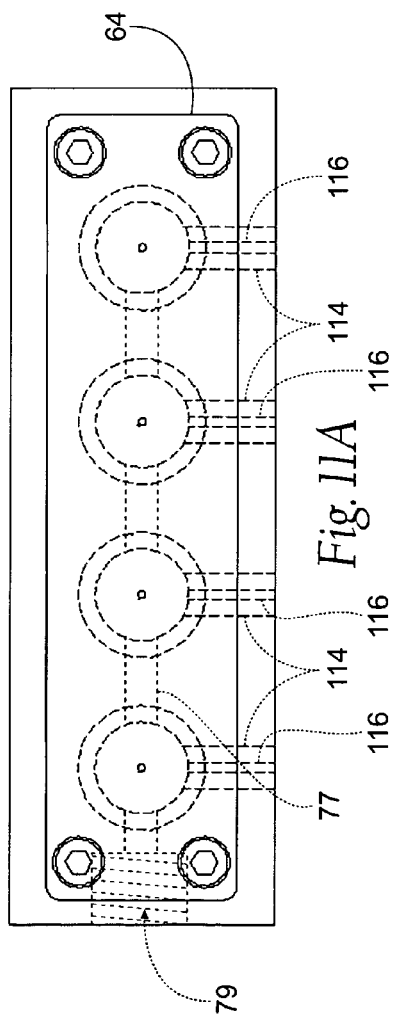
FIG. 11A is a front elevation view of an embodiment of a valve manifold including a plurality of valves according to the present invention.
Figure 11B:
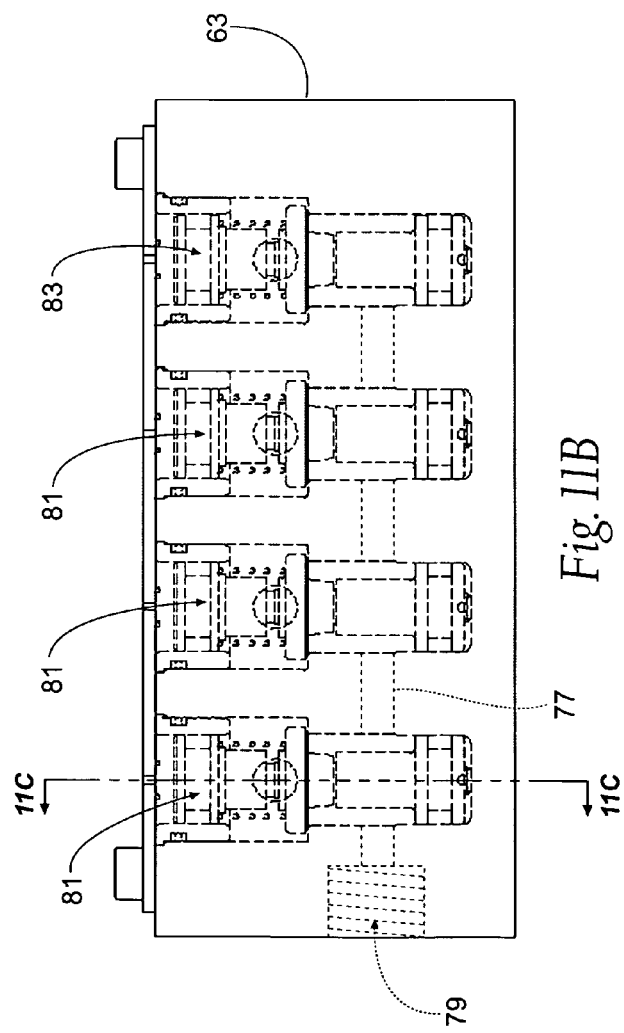
FIG. 11B is a bottom plan view of the embodiment of FIG. 11A.

Another embodiment may include a plurality of cartridges 200 within the same valve body 63, as shown in FIGS. 11A, 11B and 11C. The cartridge 200 can be mounted in manifolds, air cylinder end caps, and other devices to become an integral part of the product. This can save time and money, especially where mass production is involved. Because of the simple one-piece body design, the cavity for the cartridge can be machine from one side of the part and can be replaced in a very short time.

The design of the cartridge 200 allows it to be mounted in a machined manifold 63. The sleeve bearing 250 design is less expensive to manufacture and maintain concentricity. The insertion of the end cap spring 256 inside of the first piston head 210 also allows for a lower profile design and a less expensive cover plate. The cost for multiple cartridge designs is significantly reduced with this new design. A single cover plate 64 can be used to cover several mounted cartridges, instead of each cartridge having an individual cover.

In this design, the input counterbores 110b of all of the cartridge bores 110 may be cascaded together through a common header channel 77 formed into the valve body, which is in fluid communication with a common input port 79. The first adjacent valves 81 are provided with a pressure source bore 113, also in fluid communication with each respective input counterbore 110b. Thus, the pressure source bore 113 from a preceding valve is coupled to an input port 112 on an adjacent valve. Each respective output port 114 and respective pilot port 116 may be coupled to distinct pneumatic devices for control thereof.

The foregoing is considered as illustrative only of the principles of the invention. Furthermore, since numerous modifications and changes will readily occur to those skilled in the art, it is not desired to limit the invention to the exact construction and operation shown and described. For instance, it will occur that various combinations of the features herein described may be accommodated. For instance, while the preferred embodiment has been generally described as a pneumatic linear actuator, it is to be understood that an embodiment of the present invention may utilize or be utilized with any fluid motor. Furthermore, while the preferred embodiment has been described in connection with air as the fluid, it is to be understood that a valve according to the present invention would also function with other fluids such as oil and water. While the preferred embodiment has been described, the details may be changed without departing from the invention, which is defined by the claims.

I claim:

1. A valve comprising:
    a valve body comprising:
        a cartridge bore comprising a piston bore, an input counterbore, an output counterbore, and a bearing sleeve counterbore, said input counterbore and said output counterbore meeting at a sealing ledge;
        an input reentrant bore which intersects said input counterbore;
        an output reentrant bore which intersects said output counterbore; and
        a pilot reentrant bore which intersects said piston bore; and
        a counterbalance reentrant bore, said counterbalance reentrant bore intersecting said pilot reentrant bore and said output reentrant bore and said counterbalance reentrant bore being free of obstruction between said pilot reentrant bore and said output reentrant bore;
    a piston cartridge disposed at least partially within said cartridge bore, said piston cartridge comprising:
        a longitudinal piston rod;
        a first piston head secured to one end of said piston rod;
        a second piston head secured to a second end of said piston rod, said second piston head disposed in said piston bore;
        a poppet member slidably disposed on said piston rod within said output counterbore; and
        a poppet bias spring located between said poppet member and said first piston head biasing said poppet member in a poppet bias direction against said sealing ledge;
    an end cap spring acting against said first piston head, biasing said piston rod in said poppet bias direction; and
    a bearing sleeve inserted into said bearing counterbore, extending into said output counterbore,
    wherein said first piston head is disposed in said bearing sleeve and said second piston head is disposed in said piston bore.

2. A valve according to claim 1, wherein said valve body is a unitary member.

3. A valve according to claim 1 further comprising:
    a flow control mechanism, said flow control mechanism comprising:
        a mounting plate including a threaded adjusting aperture formed therethrough;
        a threaded adjusting screw extending through said adjusting aperture;
        a lock nut threaded onto said adjusting screw and adapted to selectively prevent rotation of said adjusting screw with respect to said mounting plate;
    wherein said mounting plate is coupled to said valve body to cover said bearing sleeve counterbore, and
    further wherein said adjusting screw extends into said output counterbore.

4. A valve according to claim 1 further comprising an adjustable pilot mechanism comprising:
    a mounting plate including a threaded adjusting aperture formed therethrough;
        a threaded adjusting screw extending through said adjusting aperture;
        a lock nut threaded onto said adjusting screw and adapted to selectively prevent rotation of said adjusting screw with respect to said mounting plate;
    wherein said mounting plate is coupled to said valve body to cover said bearing sleeve counterbore, and
    further wherein said adjusting screw abuts said end cap spring.

5. A valve according to claim 1, said valve further comprising a manual release mechanism accessible from without said valve body, adapted to selectively release fluid from said output counterbore.

6. A valve according to claim 5, wherein said manual release mechanism is a plunger extending through said valve body and abutting said piston cartridge within said piston bore.

7. A valve according to claim 5, wherein said manual release mechanism comprises:
    a manual release reentrant bore in fluid communication with said output counterbore; and a fluted plunger disposed at least partially in said manual release reentrant bore.

8. A valve according to claim 1, said valve further comprising:
- an output swivel including a throughbore in fluid communication with said output reentrant bore;
- a swivel mounting plate stationarily coupled to said valve body, said swivel mounting plate supporting said output swivel in a rotatable relationship with said valve body.

9. A valve according to claim 1, wherein the counterbalance bore is drilled into a surface of the valve body, and the counterbalance bore is sealed at a position between said surface of the valve body and the pilot reentrant bore.

10. A valve comprising:
- a valve body comprising:
  - a cartridge bore comprising a piston bore, an input counterbore, an output counterbore, and a bearing sleeve counterbore, said input counterbore and said output counterbore meeting at a sealing ledge;
  - an input reentrant bore which intersects said input counterbore;
  - an output reentrant bore which intersects said output counterbore;
  - a sensor reentrant bore formed into said valve body, said sensor reentrant bore in fluid communication with said output counterbore and spaced from said output reentrant bore; and
  - a pilot reentrant bore which intersects said piston bore;
- a piston cartridge disposed at least partially within said cartridge bore, said piston cartridge comprising:
  - a longitudinal piston rod;
  - a first piston head secured to one end of said piston rod;
  - a second piston head secured to a second end of said piston rod, said second piston head disposed in said piston bore;
  - a poppet member slidably disposed on said piston rod within said output counterbore; and
  - a poppet bias spring located between said poppet member and said first piston head biasing said poppet member in a poppet bias direction against said sealing ledge;
- an end cap spring acting against said first piston head, biasing said piston rod in said poppet bias direction; and
- a bearing sleeve inserted into said bearing counterbore, extending into said output counterbore,
- wherein said first piston head is disposed in said bearing sleeve and said second piston head is disposed in said piston bore.

11. A valve according to claim 10 further comprising an auto release mechanism comprising:
- a release housing having a sensor input port, a control input port and a release output port;
- a release piston adapted to selectively allow flow from said sensor input port to said release output port,
- wherein said release piston is biased open by a release piston bias spring and may be closed by applying a fluid pressure to said piston through said control input port.

12. A valve according to claim 11, further comprising a needle valve to adjust a flow of fluid through said sensor input port.

* * * * *